(No Model.)
B. WALTON.
BIRD TRAP.
No. 418,965. Patented Jan. 7, 1890.
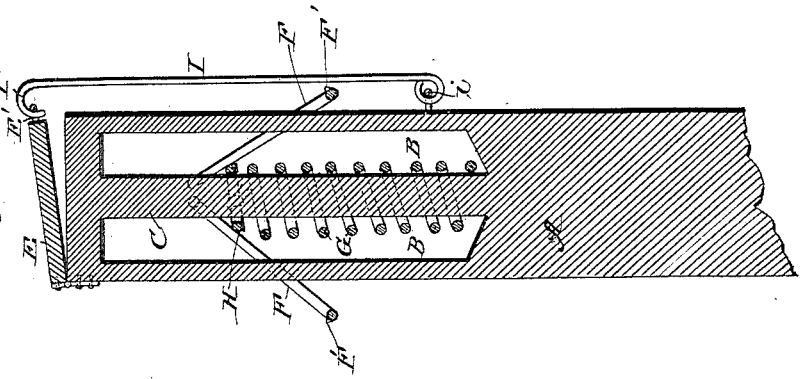
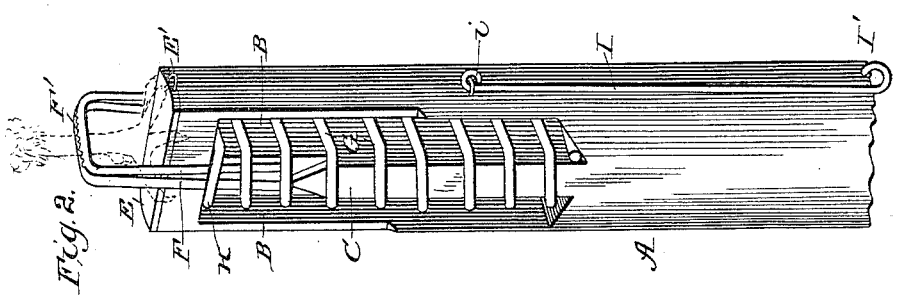
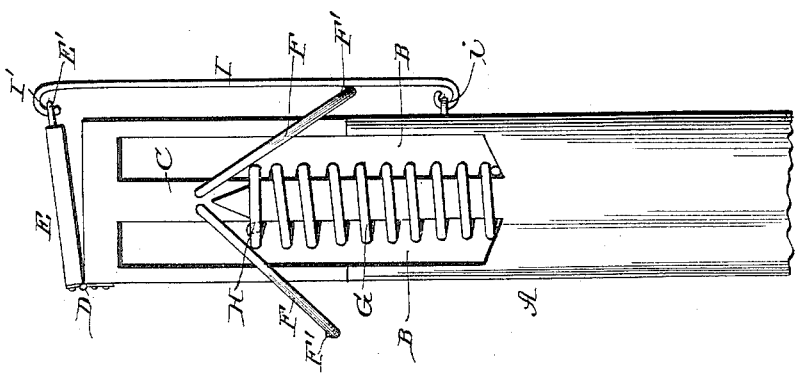
WITNESSES:
Fred G. Dieterich
Jos. A. Ryan
INVENTOR
Benjamin Walton.
BY Munn & Co
ATTORNEY

UNITED STATES PATENT OFFICE.

BENJAMIN WALTON, OF COMPTON, CALIFORNIA.

BIRD-TRAP.

SPECIFICATION forming part of Letters Patent No. 418,965, dated January 7, 1890.

Application filed May 20, 1889. Serial No. 311,481. (No model.)

*To all whom it may concern:*

Be it known that I, BENJAMIN WALTON, of Compton, in the county of Los Angeles and State of California, have invented a new and useful Improvement in Bird-Traps, of which the following is a specification.

My invention consists in a new and improved bird-trap, which will be hereinafter fully described and claimed.

Referring to the accompanying drawings, Figure 1 is a side elevation showing my new and improved bird-trap "set." Fig. 2 is a perspective side view showing the trap sprung, and Fig. 3 is a central longitudinal sectional view of the trap.

The same letters of reference indicate corresponding parts in all the figures.

Referring to the several parts by letter, my bird-trap is designed to be secured on the upper end of a pole or stake or built in the upper end of a stake or pole, so that hawks, crows, &c., will be deceived into the idea that it is an ordinary pole or stake and will alight upon the top of the same and be captured by the trap.

It consists in forming a block A on the upper end of a pole or stake, with two parallel longitudinal slots B B, leaving a central strip C, as shown. To the top of this block is hinged by one end by a hinge D a plate E, which may be of iron or of any other suitable material. In the upper part of the central strip C are hinged the lower inner ends of two jaws F, the upper meeting ends of which are serrated, formed with teeth F' on their meeting edges, like the jaws of a steel-trap. Around the central strip C is placed a flattened spiral spring G, to the upper end of which is secured a flattened oblong metal ring H. To one side of the block is hinged, by a staple $i$, passing through an eye at that end, the lower end of a catch I, the upper free end of which is formed with a hook I', which is adapted to engage with a small staple E' in the free end of the hinged plate E when the trap is set.

To set the trap, the ring H at the upper end of the spring G is pulled down with one hand, thus compressing the spring and letting the jaws F fall down on each side, as shown in Fig. 1. The catch I is then turned up with the other hand and the free end of the hinged plate E raised slightly to cause the staple E' to engage the hook I' at the upper end of the catch I, the catch wire or rod being of such length that the free end of the plate E has to be raised a little to cause it to reach and engage the hook I', as clearly shown in Fig. 1 of the drawings. The jaw F on the side next the catch, under the pressure of the compressed spring, presses the catch I outward, so that its upper hooked end will bind and hold on the staple E', holding the plate E raised. The outside of the pole end or block is left as complete and unbroken as possible to preserve its resemblance to an ordinary pole, and when a crow, hawk, or other bird alights upon the top of the pole or block, the block being secured to the top of a stake or pole, the weight of the bird will press the hinged plate E down, freeing its end staple E' from the hook of the catch I, when the spiral spring G will spring up, throwing the catch out and down and raising the jaws and bringing them together to seize the bird.

From the foregoing description, taken in connection with the accompanying drawings, the construction and operation of my invention will be readily understood.

It will be seen that my trap is simple, cheap, and strong in construction, and very effective in its operation. It can be easily made at a small cost and will prove very satisfactory. The greater part of the mechanism being hid in the pole end or block will cause the trap to prove far more effective than a more conspicuous one would be. The ring H may, if preferred, be dispensed with; but the trap operates much better with it.

Having thus described my invention, what I claim, and desire to secure by Letters Patent, is—

1. In a bird-trap, the combination, with a piece A, of the plate E, hinged at one end to the upper end of said piece and having the staple E' at its free end, the catch I, hinged to the piece A at its lower end and having the hooked upper end, the jaws F, hinged in the piece A, and the spiral spring G, arranged beneath the jaws F, substantially as set forth.

2. In a bird-trap, the combination of the piece A, formed with the longitudinal slots B, the plate E, hinged at one end to the upper end of piece A and having the staple E' at its free end, the catch I, hinged to the piece A at its lower end and having the hooked upper end, the jaws F, hinged in the piece A, and the spiral spring G, arranged beneath the jaws F, substantially as set forth.

3. In a bird-trap, the combination of the piece A, formed with the longitudinal slots B, the plate E, hinged at one end to the upper end of piece A and having the staple E' at its free end, the catch I, hinged to the piece A at its lower end and having the hooked upper end, the jaws F, hinged in the piece A, and the spiral spring G, arranged beneath the jaws F and having the oval ring H at its upper end, substantially as set forth.

BENJAMIN WALTON.

Witnesses:
E. S. ROBINSON,
A. P. BENTLEY.